US010319238B2

(12) United States Patent
Robin

(10) Patent No.: US 10,319,238 B2
(45) Date of Patent: Jun. 11, 2019

(54) METHOD FOR TRANSMITTING FLIGHT PARAMETERS FROM A LEADING AIRCRAFT TO AN INTRUDING AIRCRAFT

(71) Applicant: Airbus Operations S.A.S., Toulouse (FR)

(72) Inventor: Jean-luc Robin, Saint-Jean (FR)

(73) Assignee: Airbus Operations S.A.S. (FR)

( * ) Notice: Subject to any disclaimer, the term of this patent is extended or adjusted under 35 U.S.C. 154(b) by 0 days.

(21) Appl. No.: 15/957,329

(22) Filed: Apr. 19, 2018

(65) Prior Publication Data

US 2018/0308369 A1  Oct. 25, 2018

(30) Foreign Application Priority Data

Apr. 24, 2017 (FR) ...................... 17 53524

(51) Int. Cl.
*G08B 21/00* (2006.01)
*G08G 5/00* (2006.01)
(Continued)

(52) U.S. Cl.
CPC ........... *G08G 5/0008* (2013.01); *G05D 1/104* (2013.01); *G08G 5/0021* (2013.01);
(Continued)

(58) Field of Classification Search
CPC ........ G08G 5/008; G08G 5/0021; G08G 5/04; G08G 5/0078; G08G 5/0091; G08G 5/045; G05D 1/104; G01S 2205/005
(Continued)

(56) References Cited

U.S. PATENT DOCUMENTS 4,196,434 A * 4/1980 Funatsu .............. G01S 13/9303
342/32
5,208,591 A * 5/1993 Ybarra .................. G01S 7/2923
340/961

(Continued)

FOREIGN PATENT DOCUMENTS

EP        2851889 A2    3/2015
WO    2004/029902 A1    4/2004

OTHER PUBLICATIONS

FR 1753524 Search Report dated Oct. 24, 2017.

*Primary Examiner* — Kerri L McNally
*Assistant Examiner* — Thang D Tran
(74) *Attorney, Agent, or Firm* — Lerner, David, Littenberg, Krumholz & Mentlik, LLP

(57) ABSTRACT

A method for transmitting flight parameters from a leading aircraft (L) to at least one intruding aircraft (I), wherein, the transmission is effected by a collision avoidance system of TCAS type. The transponder of the leading aircraft (L) is configured to measure the spectrum of an interrogation signal received from the intruding aircraft (I) and to compare the power of the spectrum to a threshold power. If the power of the interrogation signal is greater than or equal to the threshold power, then the intruding aircraft (I) is eligible to receive flight parameters from the leading aircraft to be able to compute the position of the centers or the force of circulation of wake vortexes (14L, 15L) generated by the leading aircraft (L). The exchange of flight parameters from the leading aircraft only to eligible intruding aircraft makes it possible to not exceed the maximum automated communication bandwidth capacity.

4 Claims, 8 Drawing Sheets

(51) Int. Cl.
*G08G 5/04* (2006.01)
*G05D 1/10* (2006.01)

(52) U.S. Cl.
CPC ......... *G08G 5/0078* (2013.01); *G08G 5/0091* (2013.01); *G08G 5/04* (2013.01); *G08G 5/045* (2013.01); *G01S 2205/005* (2013.01)

(58) Field of Classification Search
USPC ........................................................ 340/945
See application file for complete search history.

(56) References Cited

U.S. PATENT DOCUMENTS

| | | | | |
|---|---|---|---|---|
| 6,262,679 | B1* | 7/2001 | Tran | G01S 13/9303 342/29 |
| 6,271,768 | B1* | 8/2001 | Frazier, Jr. | G08G 5/0008 340/961 |
| 8,493,239 | B2* | 7/2013 | Dehais | G08B 29/02 244/200 |
| 2002/0075171 | A1* | 6/2002 | Kuntman | G01C 23/00 340/961 |
| 2003/0016145 | A1* | 1/2003 | Bateman | B64D 43/02 340/967 |
| 2005/0156777 | A1* | 7/2005 | King | G01S 3/023 342/29 |
| 2006/0030353 | A1* | 2/2006 | Jun | H04B 1/1615 455/550.1 |
| 2008/0109163 | A1* | 5/2008 | Stone | G08G 5/0008 301/16 |
| 2008/0198041 | A1* | 8/2008 | Sallier | G01C 5/005 340/978 |
| 2008/0255713 | A1* | 10/2008 | Onu | B64C 9/12 701/3 |
| 2009/0037037 | A1* | 2/2009 | Mettes | G08G 5/00 701/14 |
| 2010/0032519 | A1* | 2/2010 | Chareyre | B64C 5/18 244/87 |
| 2010/0100225 | A1* | 4/2010 | Reed | B64D 9/00 700/213 |
| 2010/0174426 | A1* | 7/2010 | Turung | G05D 1/0061 701/11 |
| 2010/0318244 | A1* | 12/2010 | Gomez | G01C 21/00 701/3 |
| 2011/0255506 | A1* | 10/2011 | Toth | H04B 7/18506 370/331 |
| 2012/0022723 | A1* | 1/2012 | Botargues | G05D 1/0055 701/4 |
| 2012/0149300 | A1* | 6/2012 | Forster | H04W 52/0229 455/11.1 |
| 2013/0218374 | A1* | 8/2013 | Lacko | G08G 5/025 701/16 |
| 2013/0317673 | A1* | 11/2013 | Leroy | G08G 5/0008 701/14 |
| 2014/0300495 | A1* | 10/2014 | Scheu | G08G 5/0021 340/961 |
| 2015/0088342 | A1* | 3/2015 | Conner | G01W 1/10 701/14 |
| 2015/0205302 | A1* | 7/2015 | Buisson | G05D 1/101 701/18 |
| 2015/0215899 | A1* | 7/2015 | Kumar | H04W 72/02 455/59 |
| 2016/0011073 | A1* | 1/2016 | Long | G01M 5/0016 701/34.4 |
| 2016/0229554 | A1* | 8/2016 | Kawalkar | G01C 23/005 |
| 2016/0328981 | A1* | 11/2016 | Herder | G08G 5/0021 |
| 2016/0343257 | A1* | 11/2016 | Kim | B64C 19/00 |

* cited by examiner

METHOD FOR TRANSMITTING FLIGHT PARAMETERS FROM A LEADING AIRCRAFT TO AN INTRUDING AIRCRAFT

FIELD OF THE INVENTION

The present invention relates to a method for transmitting flight parameters from an aircraft, called leading aircraft, to at least one other aircraft, called intruding aircraft, in order for said intruding aircraft to be able to accurately compute the positions of the centres and/or the force of circulation of the wake vortexes generated by the leading aircraft.

BACKGROUND OF THE INVENTION

An aircraft in flight generates, in its wake, two wake vortexes. From the wings, the vortexes tend first of all to approach one another, then to maintain a more or less constant distance between one another while losing altitude relative to the altitude at which they were generated.

As is known, the position of the centres and the force of circulation of the vortexes generated by an aircraft can be computed from flight parameters of the aircraft such as the weight, the altitude, the roll angle, the aerodynamic configuration, the wing span, the density of the air at the point of flight, the speed, etc.

It is advantageous for an aircraft, called intruding aircraft, to be able to compute the positions of the centres of the wake vortexes generated by a leading aircraft, in order:

to fly in formation behind the leading aircraft by maximizing the benefit from the up draughts of the vortexes in order to reduce its fuel consumption; or to avoid undergoing turbulences induced by the vortexes.

BRIEF SUMMARY OF THE INVENTION

The computation of the force of circulation of a wake vortex generated by a leading aircraft also allows a following aircraft to know the distribution of the force of the up draughts relative to the centre of a wake vortex and therefore allows the intruding aircraft to place itself so as to effectively benefit from said vortex.

To this end, the invention relates to a method for transmitting flight parameters from a leading aircraft to at least one intruding aircraft, each aircraft comprising:

a collision avoidance system configured to detect probabilities of collisions with other aircraft flying within a surveillance volume distributed around the aircraft, said system comprising an interrogator, and a transponder connected to an antenna;

flight management system collecting the flight parameters of the aircraft, the collision avoidance system being connected to the flight management system;

the method comprising the following successive steps:

interrogation, in which the interrogator of the intruding aircraft transmits an interrogation signal comprising a request for at least one flight parameter;

reception, in which the transponder of the leading aircraft receives, via the antenna, the interrogation signal transmitted by the interrogator of the intruding aircraft;

determination, in which the transponder of the leading aircraft:

in an analysis substep, analyses the spectrum of the interrogation signal received and determines the power of said signal;

in a comparison substep, compares the power of the interrogation signal received to a threshold power; and in a surveillance and determination substep, determines that the intruding aircraft is eligible to receive the at least one flight parameter requested if the power of the interrogation signal is greater than or equal to the threshold power, and determines that the intruding aircraft is ineligible to receive the at least one flight parameter otherwise;

transmission, in which the transponder of the leading aircraft sends a response signal to the interrogator of an eligible intruding aircraft in response to the interrogation signal, the response signal containing the at least one flight parameter of the leading aircraft requested by the intruding aircraft in the interrogation step, an ineligible intruding aircraft on the contrary not receiving any flight parameter from the leading aircraft in response to its request.

One of the advantages of the invention is to limit the sending of flight parameters of the leading aircraft to (eligible) intruding aircraft located within a certain distance of the leading aircraft, this distance being linked to the power of the interrogation signal that the intruding aircraft transmit. It is thus possible to transmit a flight parameter from the leading aircraft to an intruding aircraft without exceeding the automated communication bandwidth capacity since only a restricted number of aircrafts is eligible to receive flight parameters from the leading aircraft.

BRIEF DESCRIPTION OF THE DRAWINGS

The features of the invention mentioned above, and others, will become more clearly apparent on reading the following description of exemplary embodiments, said description being given in relation to the attached figures.

DETAILED DESCRIPTION

Figure 1:
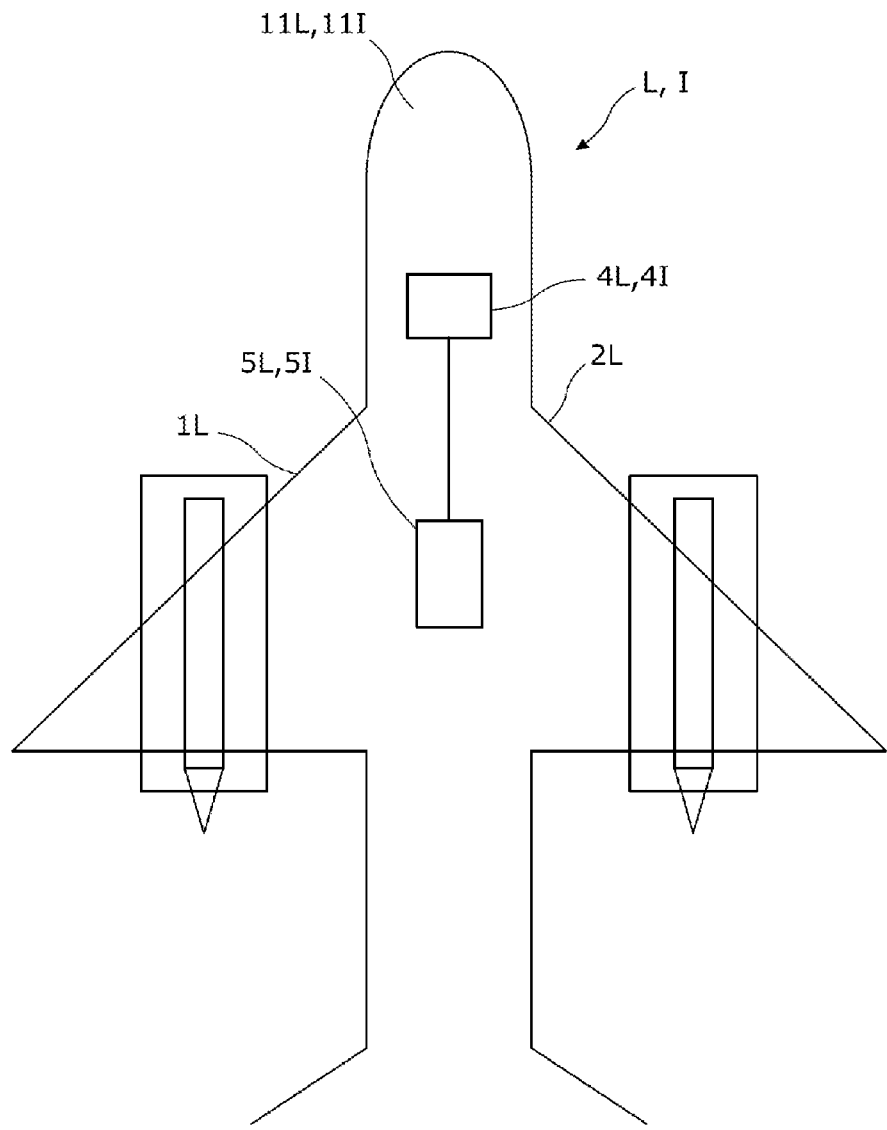
FIG. 1 is a schematic representation of an aircraft according to the invention comprising a plurality of embedded systems allowing the implementation of a method for transmitting flight parameters according to the invention, including a collision avoidance system and a flight management system.

In relation to FIG. 1, an aircraft L, I comprises two wings 1L, 2L, and a plurality of embedded systems in its fuselage 11L, 11I, including a flight management system 4L, 4I of FMS type and a collision avoidance system 5L, 5I connected to the flight management system 4L, 4I.

The flight management system 4L, 4I compiles flight parameters of the aircraft, namely: weight, altitude, roll angle, aerodynamic configuration, wing span, density of the air at the point of flight, speed. The collision avoidance system 5L, 5I is connected to the flight management system 4L, 4I from which it receives the flight parameters of the aircraft.

As is known, the collision avoidance system 5L, 5I alerts the crew of the aircraft to probabilities of collisions with other aircraft flying within a surveillance volume distributed around (over 360°) the aircraft and the dimensions of which are dependent on the speed of the aircraft L, I.

Figure 2:
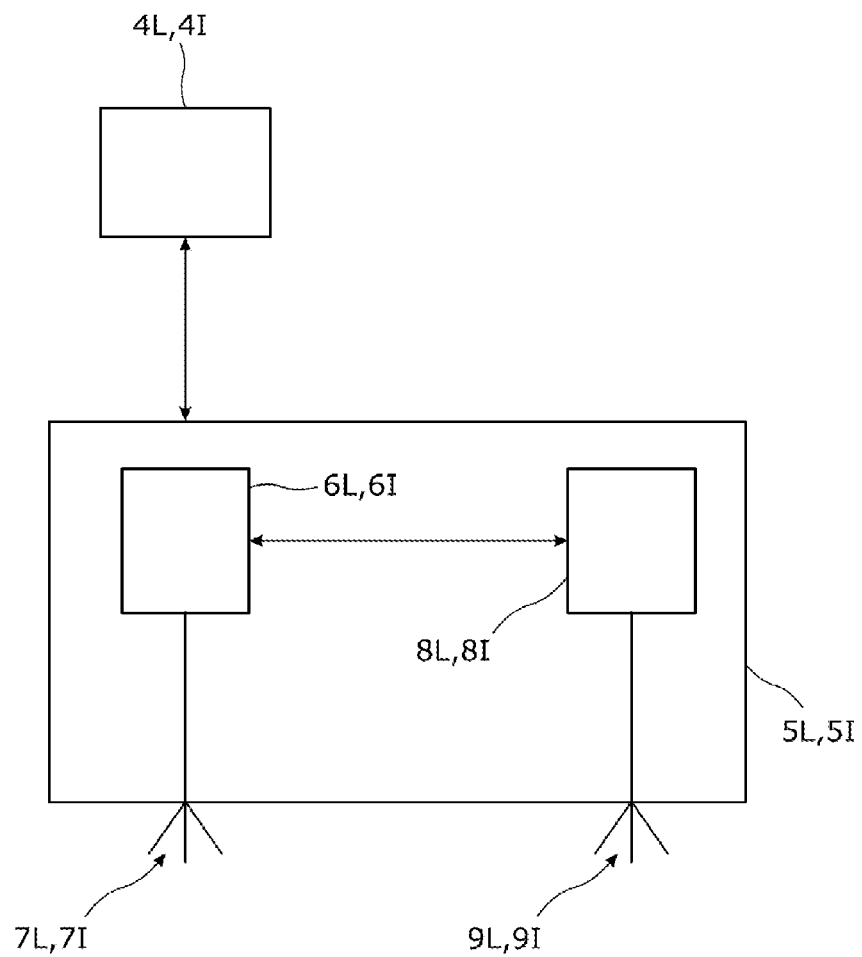
FIG. 2 is a schematic representation of a detail of the connections between the management system and the collision avoidance system according to an embodiment of the invention, the collision avoidance system comprising a transponder.
Figure 3:
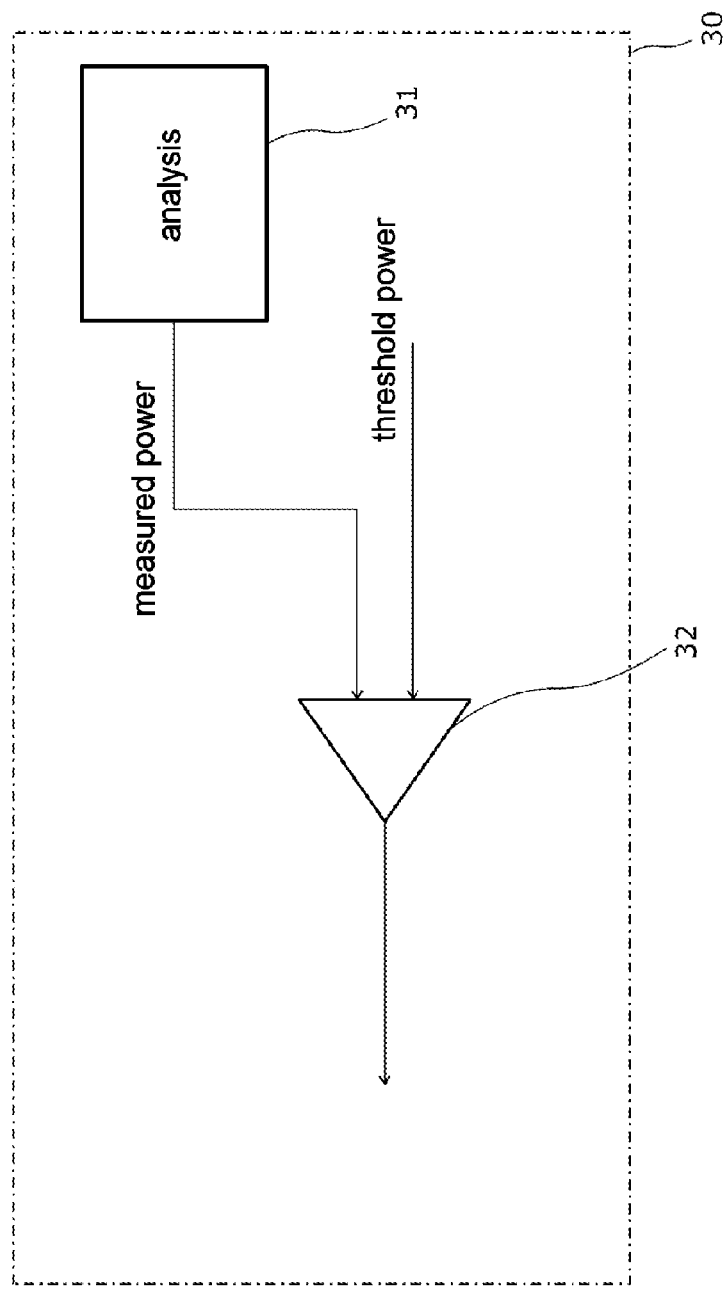
FIG. 3 is a schematic representation in the form of logic blocks of the transponder of FIG. 2 according to an embodiment of the invention.

Referring to FIG. 2, the collision avoidance system is an active device of TCAS (Traffic Collision Avoidance System) type and comprises, for this purpose:

- an interrogator 6L, 6I, of central processing unit type, connected to at least one directional antenna 7L, 7I, called interrogator antenna, mounted on the aircraft;
- a transponder 8L, 8I (or XPDR in aeronautical terminology), of central processing unit type, connected to at least one antenna 9L, 9I, for example omnidirectional, called transponder antenna, mounted on the aircraft.

Throughout the description, central processing unit should be understood to mean a device comprising at least one processor comprising Boolean or logic circuits (logic gates, comparator), and memories. The processor executes instructions contained in the memories of the central processing unit.

In the principle of operation of the active devices of TCAS type, the interrogator 6I of an aircraft I transmits interrogation signals at a fixed frequency of 1030 MHz and at regular intervals (for example every second).

The transponder 8L of another aircraft L receiving an interrogation signal responds by transmitting a response signal to the aircraft I transmitting the interrogation signal. The response signal contains the identifiers of the leading aircraft L and allows the flight management system 4I of the intruding aircraft to estimate, after analysis of said signal, a time of collision and to take measures to eliminate any risk of collision.

The method according to the invention will be explained in relation to FIGS. 3 to 6. An aircraft L is considered, called leading aircraft, generating, on each of its two wings 1L, 2L, a wake vortex 14L, 15L (respectively port-starboard) and a plurality of intruding aircraft I flying within the surveillance volume of the leading aircraft L.

Figure 4:
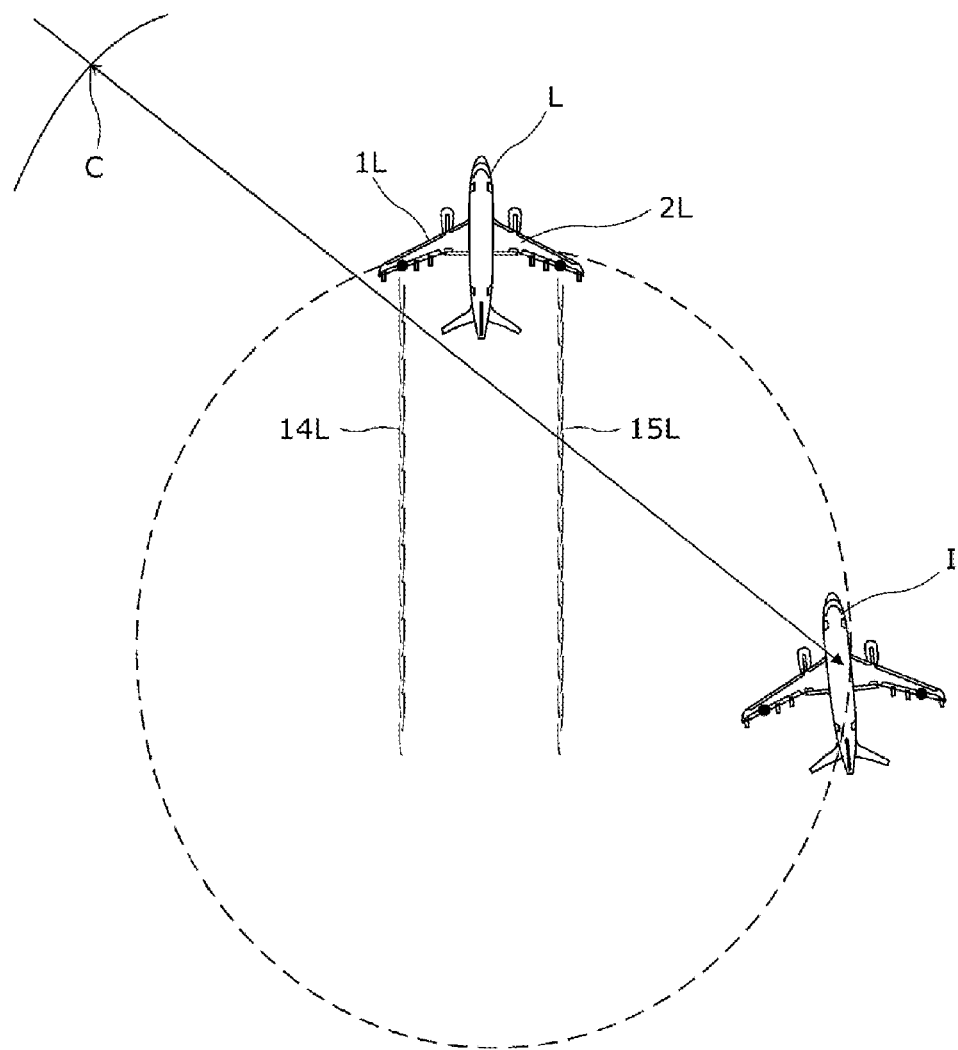
FIG. 4 is a schematic representation of a formation of two aircraft as illustrated in FIG. 1, including a leading aircraft generating wake vortexes and an intruding aircraft flying in formation in the wake of the leading aircraft.
Figure 5:
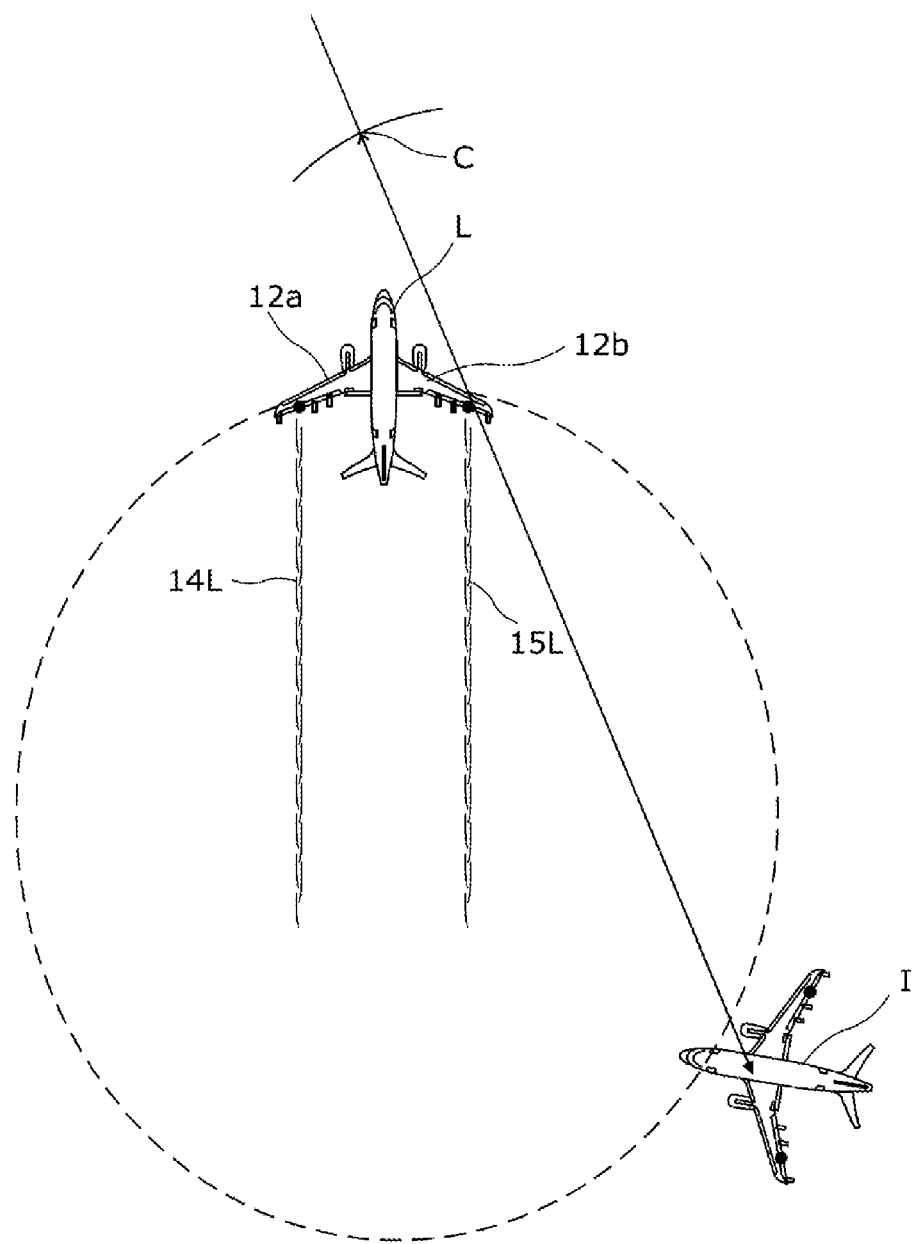
FIG. 5 is a view similar to FIG. 4 in which the intruding aircraft crosses the wake of the leading aircraft.
Figure 6:
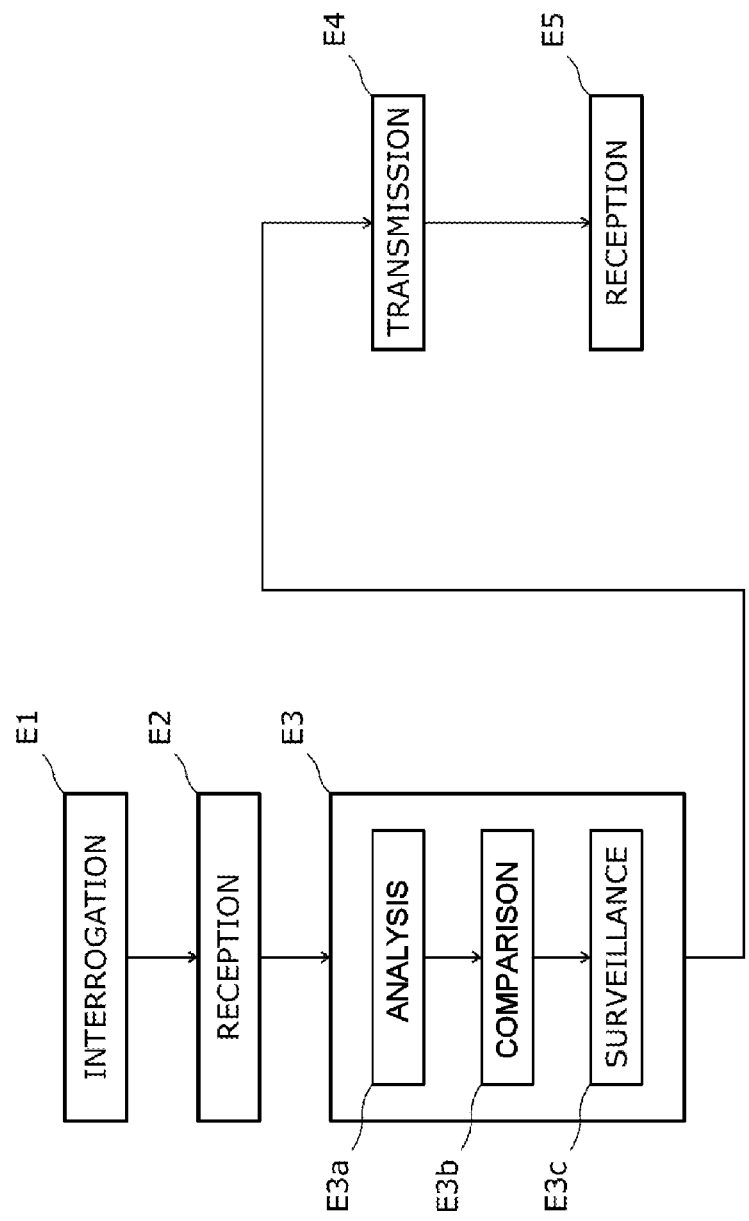
FIG. 6 is a schematic view of the steps of the method for transmitting flight parameters between a leading aircraft and an intruding aircraft in the case of FIG. 4 or FIG. 5, according to an embodiment of the invention.

Just one intruding aircraft I is represented in the FIGS. 4 and 5: an intruding aircraft I flying in formation behind the leading aircraft L in FIG. 4, or, in FIG. 5, an intruding aircraft I crossing the wake of the leading aircraft L with a heading substantially at right angles to that of the leading aircraft L.

Each of the leading L or intruding I aircraft is equipped as described above. The references in the figures bear the suffix L for the leading aircraft or I for the intruding aircraft.

- in an interrogation step E1, the interrogator 6I of the intruding aircraft periodically transmits (for example every 10 seconds, or every 30 seconds), via the interrogator antenna 7I, an interrogation signal, on 1030 MHz for example, in each of the four 90° azimuth segments. The interrogation signal transmitted contains the address of the intruding aircraft I and a request for at least one flight parameter (request formulated by the flight management system 4I);
- in a reception step E2, the transponder 8L of the leading aircraft L, flying within the surveillance volume of the intruding aircraft, receives the interrogation signal from the intruding aircraft I via its antenna 9L;
- in a determination step E3, the transponder 8L determines whether the intruding aircraft I is eligible to receive a flight parameter from the leading aircraft L:
- in an analysis substep E3a, the processor 30 of the transponder 8L implements a signal spectrum analysis program 31 stored in the memories (not represented) of the transponder in order to analyse the spectrum of the interrogation signal received from the intruding aircraft I and determine the power (at the transmission frequency of the interrogator 6I of the intruding aircraft I) of said signal;
- in a comparison substep E3b, the transponder 8L of the leading aircraft compares, via a comparator 32 of the transponder 8L, the power of the signal determined in the preceding substep to a threshold power. The output signal from the comparator 32 switches from a first state to a second state (for example, switches from the 0 state to the 1 state) when the power of the interrogation signal received by the leading aircraft L is greater than or equal to the threshold power, and remains in the first state otherwise;
- in a surveillance and determination substep E3c, the transponder 8L surveys the transition to the second state of the output signal of the comparator 32 and determines whether the intruding aircraft I is eligible or not to receive the at least one flight parameter requested in the interrogation step E1:
  - the intruding aircraft I is eligible if the transponder 8L has detected a transition to the second state of the output signal of the comparator 32 (power of the interrogation signal greater than or equal to the threshold power);
  - the intruding aircraft I is ineligible if the transponder 8L has not detected a transition to the second state of the output signal of the comparator 32 (power of the interrogation signal less than the threshold power);

Since the power of the interrogation signal received by the transponder 8L is directly linked to its propagation distance (the power of a signal decreases with its propagation distance), the principle implemented behind the determination step E3 amounts to determining the distance from the intruding aircraft I to the leading aircraft L and to comparing the latter to a predetermined range C, then determining that the intruding aircraft I is eligible to receive the at least one flight parameter requested if it is located at a distance less than or equal to the predetermined range C, or that the intruding aircraft is ineligible otherwise. By taking the example of a threshold power of −62 dBm, the predetermined range C is approximately 3 nm=5.55 km.

In a transmission step E4, the transponder 8L of the leading aircraft L sends, via the transponder antenna 9L, a response signal to the interrogator of the eligible intruding aircraft I, on 1090 MHz for example, in response to the interrogation signal from the intruding aircraft I. The response signal consists of a series of pulses which contain identifiers of the leading aircraft L and the at least one flight parameter of the leading aircraft L requested by the intruding aircraft I in the interrogation step E1.

On the other hand, if the intruding aircraft is ineligible, the transponder 8L of the leading aircraft L does not transmit any flight parameter from the leading aircraft L in response to the request from the intruding aircraft I. For example, the transponder 8L does not send a response signal to the interrogation signal from an ineligible intruding aircraft I.

In a reception step E5, the eligible intruding aircraft I receives the response signal which is processed by the interrogator 6I. Through the knowledge of the flight parameter or parameters of the leading aircraft L, the flight management system 4I of the intruding aircraft is capable of computing the centre position of wake vortexes 14L, 15L generated by the leading aircraft L and/or the force of circulation of said vortexes.

The position of the centres of the vortexes is obtained by the computation of the speed of descent Wv of said vortexes which is, for example, computed with the following relationship:

$$w_w = \frac{m \cdot g \cdot n_z}{2 \cdot \pi \cdot \rho \cdot V \cdot b_v^2}$$

The force of circulation F is, for example, computed with the following relationship:

$$\Gamma = \frac{m \cdot g \cdot n_z}{\rho \cdot V \cdot b_v}$$

in which
m is the weight of the aircraft generating the vortexes (kg)
g is the acceleration of gravity (9.81 m/s²)
ρ is the density of the air at the point of flight (kg·m-3)
V is the speed of the aircraft generating the vortexes (m·s-1)
by is the spacing between the 2 vortexes (m)=wing span of the aircraft generating the vortexes
nz is the load factor undergone by the aircraft (g)
φ is the roll angle of the aircraft generating the vortexes (deg)

The weight is the only flight parameter which cannot be estimated and the knowledge of which is necessary for the flight management system 4I of the intruding aircraft I to be able to compute data relating to the wake vortexes of the leading aircraft 14L, 15L via, for example, the formulae mentioned above. Consequently, to compute data relating to the wake vortexes of the leading aircraft 14L, 15L, the interrogation signal from the intruding aircraft I, transmitted in the interrogation step E1, contains at least the weight request.

The other flight parameters of the leading aircraft L, such as the speed, can, for their part, be obtained by the analysis of the interrogation/response signals exchanged during the data communication between the collision avoidance systems of TCAS type 5L, 5I of the leading aircraft L and of the intruding aircraft I, be estimated (case of wing span or load factor) or can be measured by sensors of the intruding aircraft I (case of the acceleration of gravity, the density of the air at the point of flight, the roll angle).

The series of steps described above is recommenced on each new reception of an interrogation signal by the transponder 8L of the leading aircraft L.

One of the advantages of the invention is to limit the sending of flight parameters from the leading aircraft L to intruding aircraft I located within the predetermined range C (FIGS. 4 and 5) of the leading aircraft L. It is thus possible to transmit a flight parameter from the leading aircraft L to an eligible intruding aircraft without exceeding the automated communication bandwidth capacity since only a restricted number of aircraft is eligible to receive a flight parameter from the leading aircraft L.

Advantageously, in the transmission step E4, when the intruding aircraft I is ineligible, the transponder 8L of the leading aircraft sends a response signal to the interrogation signal from the intruding aircraft I, this response signal contains an indication according to which the request from the intruding aircraft I to obtain at least one flight parameter is denied.

In a variant of the invention, in order for the flight parameters of the leading aircraft L to be only available to an intruding aeroplane I eligible to receive flight parameters from the leading aircraft L, the wave of the response signal transmitted by the transponder 8L of the leading aircraft L in the transmission step E4 is transmitted at a limited power such that it cannot be propagated beyond a distance greater than the predetermined range C, to within a margin of error so as to take account of unfavourable wave propagation conditions. The transmission power is advantageously substantially identical (to within 5%) to the power of the interrogation signal determined by the processor 30 of the transponder 8L in the analysis substep E3a.

This variant is advantageous in that it makes it possible to ensure that the flight parameters transmitted to the intruding aircraft I are not intercepted by an ill-intentioned individual.

Figure 7:
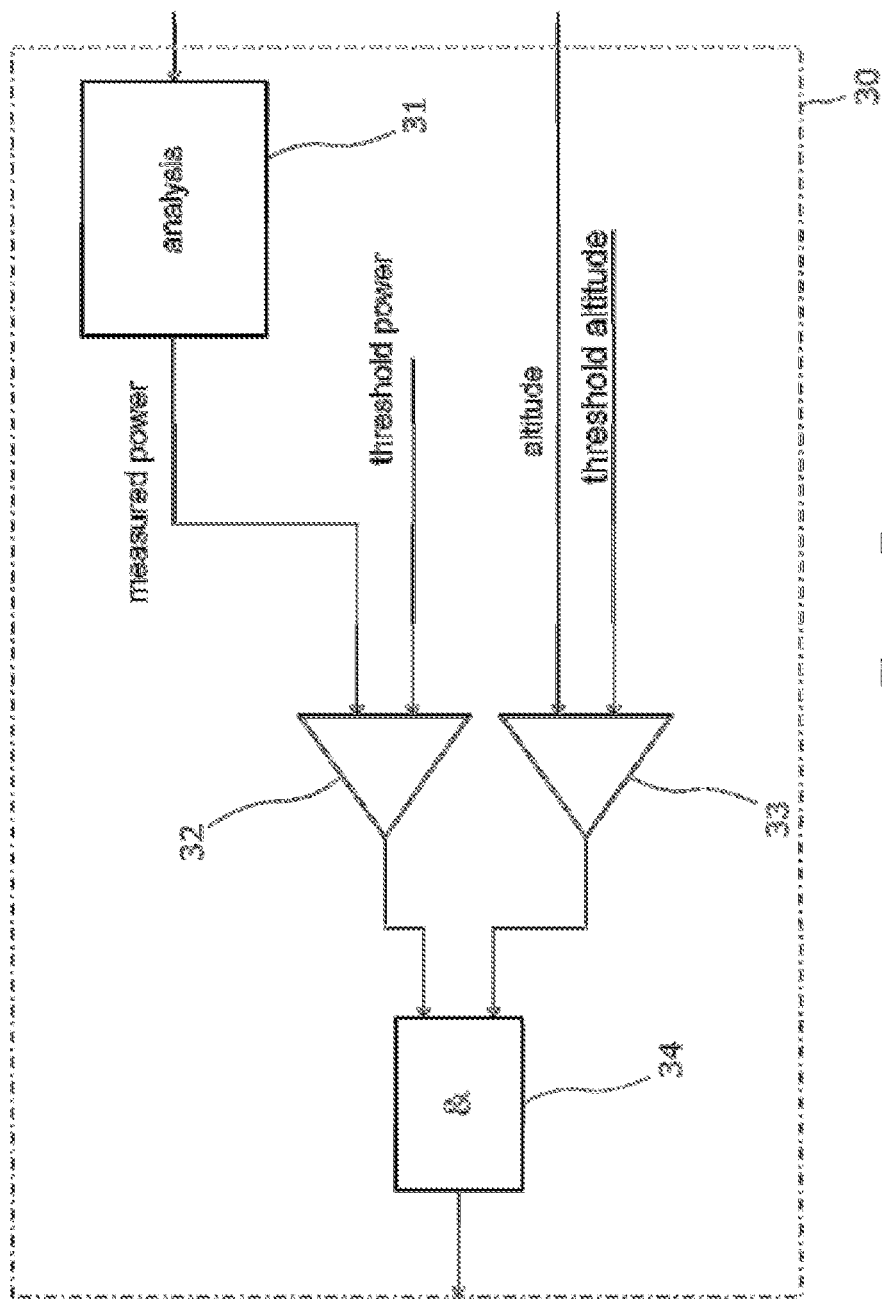
FIG. 7 is a schematic representation in the form of logic blocks of the transponder of FIG. 2 according to another embodiment of the invention.
Figure 8:
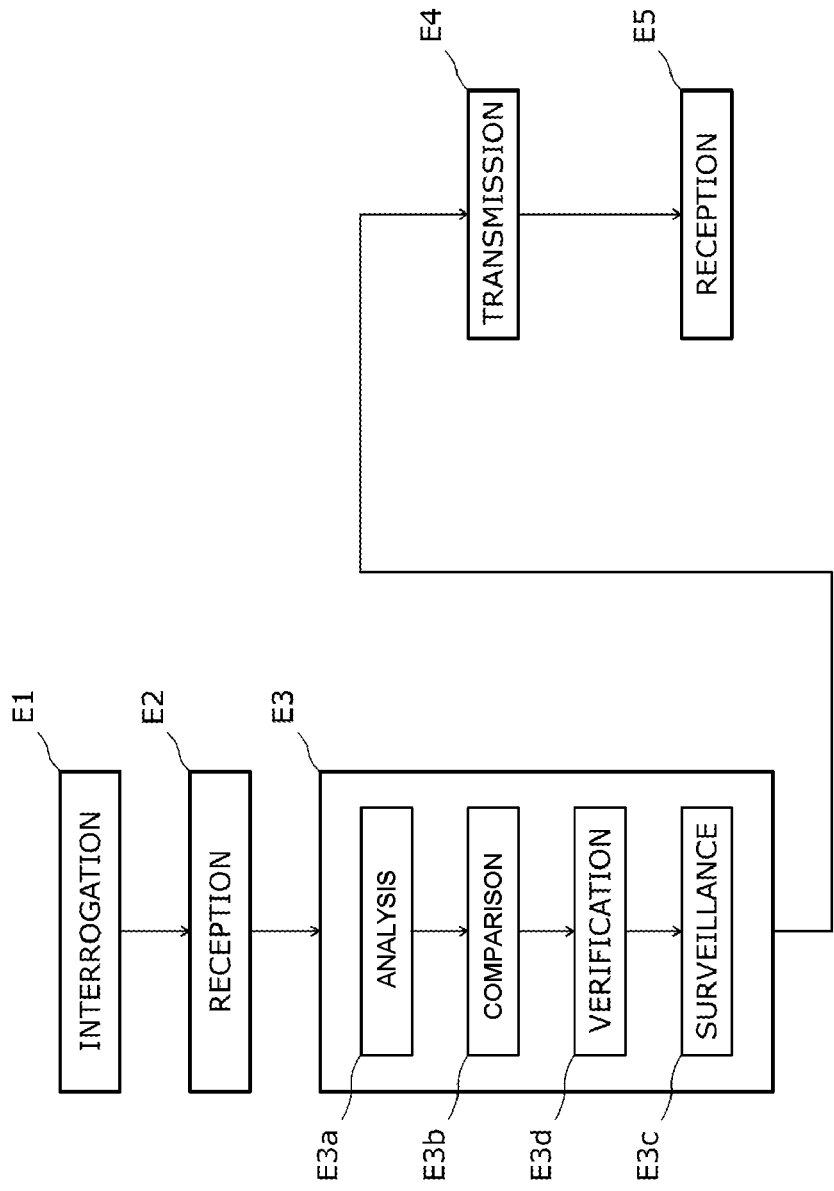
FIG. 8 is a view similar to FIG. 6 representing the steps of a method for transmitting flight parameters according to an embodiment of the invention between a leading aircraft and an intruding aircraft in the case of FIG. 4 or of FIG. 5.

According to another embodiment, in order to ensure that the flight parameters of the leading aircraft L transmitted to the intruding aircraft I cannot be intercepted by an individual, in particular by an individual on the ground, and in relation to FIGS. 7 and 8, the transponder 8L determines that the intruding aircraft I is eligible if the power of the interrogation signal is greater than or equal to the threshold power and if the altitude of the leading aircraft is greater than or equal to a threshold altitude, and is ineligible otherwise.

The threshold altitude is, for example, 20 000 feet (corresponding to the flight level FL200) equal to approximately 6000 m.

According to this variant, the transponder 8L comprises a comparator 33 for comparing the altitude of the leading aircraft to the threshold altitude and an AND logic gate 34 receiving, as input, the output signal of the comparator 32 comparing the power of the interrogation signal to the threshold power as well as the output signal of the comparator 33 comparing the altitude of the leading aircraft to the threshold altitude.

The method as described above is modified:
in that, the determination step E3 comprises a verification substep E3d, implemented before the surveillance and determination substep E3c, in which the processor 30 of the transponder 8L of the leading aircraft L implements, via the comparator 33, a comparison between the altitude of the leading aircraft L and the threshold altitude. The output signal of the comparator 33 switches from a first state to a second state (for example from 0 to 1) if the altitude of the leading aircraft is greater than or equal to the threshold altitude; it retains a first state (for example 0) otherwise; and
in that, in the surveillance and determination substep E3c, the transponder determines that:
the intruding aircraft I is eligible if the output signal of the AND logic gate 34 switches to the second state (for example set to 1) which corresponds to a change of state of the output signal of the comparator 32 comparing the power of the interrogation signal to the threshold power AND a change of state of the output signal of the comparator 33 comparing the altitude of the leading aircraft to the threshold altitude
the intruding aircraft is ineligible if the output signal of the AND logic gate 34 remains in the first state (for example 0), that is to say that neither the output signal of the comparator 32 comparing the power of the interrogation signal to the threshold power has changed state nor has the output signal of the comparator 33 comparing the altitude of the leading aircraft to the threshold altitude changed state.

In a variant of the invention, instead of measuring the power of the interrogation signal received, the processor 30 of the transponder 8L analyses the signal-to-noise ratio (that is to say the quality of the signal) of the interrogation signal received and compares this ratio to a predetermined threshold. The measurement of the quality of the interrogation signal received makes it possible to determine the distance from the intruding aeroplane I to the leading aircraft L.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for transmitting flight parameters from a leading aircraft to at least one intruding aircraft, each aircraft comprising:
    a collision avoidance system configured to detect probabilities of collisions with other aircraft flying within a surveillance volume distributed around the aircraft, said system comprising an interrogator, and a transponder connected to an antenna;
    flight management system collecting the flight parameters of the aircraft, the collision avoidance system being connected to the flight management system;
    wherein the method comprises:
    interrogation, in which the interrogator of the intruding aircraft transmits an interrogation signal comprising a request for at least one flight parameter including at least a weight of the leading aircraft;
    reception, in which the transponder of the leading aircraft receives, via the antenna, the interrogation signal transmitted by the interrogator of the intruding aircraft;
    determination, in which the transponder of the leading aircraft:
        in an analysis substep, analyses the spectrum of the interrogation signal received and determines the power of said signal;
        in a comparison substep, compares the power of the interrogation signal received to a threshold power; and
        in a surveillance and determination substep, determines that the intruding aircraft is eligible to receive the at least one flight parameter requested if the power of the interrogation signal is greater than or equal to the threshold power, and determines that the intruding aircraft is ineligible to receive the at least one flight parameter otherwise;
    transmission, in which the transponder of the leading aircraft sends a response signal to the interrogator of an eligible intruding aircraft in response to the interrogation signal, the response signal containing the at least one flight parameter of the leading aircraft requested by the intruding aircraft in the interrogation step, an ineligible intruding aircraft on the contrary not receiving any flight parameter from the leading aircraft in response to its request.

2. The method according to claim 1, wherein a flight parameter is a datum further chosen from the following data: altitude, roll angle, aerodynamic configuration, aircraft wing span, density of the air at the point of flight, speed.

3. The method according to claim 1, wherein the determination step comprises a verification substep, implemented before the surveillance and determination substep, in which the transponder of the leading aircraft compares the altitude of the leading aircraft to a threshold altitude; and
    wherein in the surveillance and determination substep, the transponder of the leading aircraft determines that the intruding aircraft is eligible to receive the at least one flight parameter requested if the power of the interrogation signal is greater than or equal to the threshold power and if the altitude of the leading aircraft is greater than or equal to the threshold altitude, and that the intruding aircraft is ineligible otherwise.

4. The method according to claim 1, wherein, in the transmission step, the interrogator of an ineligible intruding aircraft receives from the transponder of the leading aircraft a response signal to the interrogation signal, the response signal containing an indication according to which the request from the intruding aircraft to obtain at least one flight parameter is denied.

* * * * *